Patented Nov. 9, 1937

2,098,527

UNITED STATES PATENT OFFICE 2,098,527

METHOD OF CLEANING FIBROUS MATERIALS

Kurt Stickdorn, Rosslau/Anhalt, Germany, assignor, by mesne assignments, to "Unichem" Chemikalien Handels A.-G., Zurich, Switzerland, a corporation of Switzerland No Drawing. Application October 28, 1932, Serial No. 640,014. In Germany October 28, 1931

6 Claims. (Cl. 87—5)

It is already known, that heterocyclic amines or the salts thereof respectively, in the form of aqueous solutions, may be utilized to increase the cleaning and wetting effect of baths as generally used in the textile industry. It is also known, that the fatty acid salts of certain amines are of a soap-like character and that certain organic bases, in the form of their combinations with Turkey-red oil-like products are used as washing and cleaning agents.

I have now found, that also the hydrocyclic amines, which are easily soluble in water, especially the cyclohexylamine and the cyclopentylamine, as well as the homologues thereof, which are easily rendered water soluble by means of soaps or soap substituents, possess an excellent wetting, cleaning, washing, emulsive and dispersing capacity. For instance an aqueous solution of cyclohexylamine, compared with a solution of pyridine of same concentration, shows a considerably higher wetting and cleaning capacity. All these effects appear more intensely in using cyclohexylamine than with the use of heterocyclic bases, principally with pyridine. Thus the hydrocyclic amines are not only fitted as wetting, dispersing and cleaning agents, but also for scouring and mercerization purposes.

Also the soaps and Turkey-red oil-like products made by the use of said amines possess properties by far superior to the effects obtainable with ordinary soaps and Turkey-red oils.

The following examples may be understood as illustrations only and the limits of the invention are not restricted to these specific examples.

Example I

Raw cotton, for scouring, is boiled for two hours under a pressure of 0.5 atm. in a bath which contains 0.5 cc. of a concentrated solution of caustic soda and 0.2 cc. of cyclohexylamine per litre of liquid. The material dried after this treatment is uniformly cleaned and is rapidly and equally wetted through by water.

Example II

By mixing 7 parts by weight of methylcyclohexylamine with 3 parts of 30% olein potash soap, one obtains a preparation clearly soluble in water and of a remarkable wetting-out and dispersing capacity. The effect mentioned in Example I is likewise obtained in applying this compound.

Example III 2 parts by weight of distilled coco-nut-oil fatty acids, 1 part of cyclohexylamine and 1 part of water are by gentle heating converted in a thinly liquid, clear solution. This solution may be mixed with cold or warm water in any proportion. The aqueous solutions have an excellently good foaming and washing capacity. A solution of 0.5% wets-out unbleached makothreads (threads of Egyptian unbleached cotton) almost immediately even in the cold, whereas a cocoanut oil potash soap requires at least several minutes.

Example IV

Technical oleic acid is neutralized while warm by means of the calculated amount of cyclohexylamine and a highly viscous liquid is obtained. A diluted aqueous solution thereof in the cold represents a transparent thick jelly. 10 parts by weight of the preparation are mixed with 5 parts of methyl cyclohexanol and 85 parts of spindle oil. The resulting oil, mixed with water, produces very stable pure white emulsions which may be used as boring oils.

Example V

Technical lauryl alcohol is sulphonated with chloro-sulphonic acid and the thus obtained product is neutralized with an aqueous solution of cyclopentylamine. The neutralized solution is marketed with a content of 50% of cyclopentylamine-salt. Compared with other corresponding alkaline preparations it is particularly distinguished by its excellent wetting-out, foaming and cleaning properties as well as by its great resistance to salts of lime and magnesium.

The term hydrocyclic as found in the specification is used to define completely hydrogenized cyclic substances including hydro aromatic amines, methyl cyclohexanol, and the like.

I claim:

1. The method of cleaning fibrous material which consists of washing the same in an aqueous bath containing as a wetting-out and cleaning agent material of the group consisting of soap-forming fatty acid, sulfonated lauryl alcohol and Turkey-red oil neutralized by material of the group consisting of cyclohexylamine, cyclopentylamine and methylcyclohexylamine.

2. The method of cleaning fibrous material which consists of washing the same in an aqueous bath containing as a wetting out and cleaning agent a soap-forming acid neutralized with material of the group consisting of cyclohexylamine, cyclopentylamine and methylcyclohexylamine.

3. The method of cleaning fibrous material which consists of washing the same in an aqueous bath containing as a wetting-out and cleaning agent Turkey-red oil neutralized with material of the group consisting of cyclohexylamine, cyclopentylamine and methylcyclohexylamine.

4. The method of cleaning fibrous material which consists of washing the same in an aqueous bath containing as a wetting-out and cleaning agent sulfonated lauryl alcohol neutralized with material of the group consisting of cyclohexylamine, cyclopentylamine and methylcyclohexylamine.

5. The method of cleaning fibrous material which consists of washing the same in an aqueous bath containing as a wetting-out and cleaning agent the reaction product of cocoanut oil fatty acids and cyclohexylamine.

6. A cleaning composition comprising as principal ingredients cyclohexylamine and water soluble soap.

KURT STICKDORN.